US 8,401,279 B2

(12) United States Patent
Sugino et al.

(10) Patent No.: US 8,401,279 B2
(45) Date of Patent: Mar. 19, 2013

(54) ENVIRONMENT RECOGNITION SYSTEM, ENVIRONMENT RECOGNITION METHOD AND ROBOT

(75) Inventors: Tsukasa Sugino, Wako (JP); Ryujin Watanabe, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 262 days.

(21) Appl. No.: 12/849,450

(22) Filed: Aug. 3, 2010

(65) Prior Publication Data
US 2011/0026833 A1 Feb. 3, 2011

(30) Foreign Application Priority Data
Aug. 3, 2009 (JP) ................................. 2009-180559

(51) Int. Cl.
*G06K 9/00* (2006.01)

(52) U.S. Cl. ........................................................ 382/154

(58) Field of Classification Search .................... 382/154
See application file for complete search history.

(56) References Cited

U.S. PATENT DOCUMENTS

| 5,987,591 | A | * | 11/1999 | Jyumonji ..................... 700/259 |
| 2003/0007680 | A1 | * | 1/2003 | Iijima et al. .................. 382/154 |

FOREIGN PATENT DOCUMENTS

| JP | 2002-202122 | 7/2002 |
| JP | 2002-203240 | 7/2002 |
| JP | 2004-193947 | 7/2004 |
| JP | 2005-242596 | 9/2005 |
| JP | 2007-058674 | 3/2007 |
| JP | 2007-322138 | 12/2007 |
| JP | 2009-085705 | 4/2009 |

* cited by examiner

*Primary Examiner* — John Strege
(74) *Attorney, Agent, or Firm* — Rankin, Hill & Clark LLP (57) ABSTRACT

A system capable of recognizing position, a shape, a posture and the like of an object present in a marginal environment of a device such as a robot in order to make the device perform operations on the object as a subject. In an environment recognition system, 3D information and physical information (color information and the like) of a subject are associated by using camera parameters of each of a 3D image sensor and a 2D image sensor. Thereby, the position, the posture and the shape related to the subject and the physical information of the subject present in the environment of a robot are obtained.

18 Claims, 8 Drawing Sheets

ENVIRONMENT RECOGNITION SYSTEM, ENVIRONMENT RECOGNITION METHOD AND ROBOT

BACKGROUND OF THE INVENTION

1. Field of the Invention

The present invention relates to a system and the like recognizing an environment of a device.

2. Description of the Related Art

There has been disclosed an approach (for example, refer to Japanese Patent Laid-open No. 2007-322138 referred to as Patent Document 1) for estimating a position of a robot according to image data and range data acquired respectively from a camera and a laser range finder mounted in the robot.

However, when the robot performs operations on various objects present in a marginal environment thereof as a subject according to different situations, such as holding an arbitrary object with a hand thereof, it is necessary for it to recognize correctly a position, a shape, a posture and the like of the object.

SUMMARY OF THE INVENTION

The present invention has been accomplished in view of the aforementioned problems, and it is therefore an object of the present invention to provide a system and the like capable of recognizing with a high degree of accuracy a position, a shape, a posture and the like of an object present in a marginal environment of a device such as a robot in order to make the device perform operations on the object as a subject.

To attain an object described above, an environment recognition system according to the present invention which is configured to recognize an environment of a device comprises: a 3D image sensor configured to acquire 3D information of a subject by photographing a marginal environment of the device, a 2D image sensor configured to acquire physical information of the subject by photographing a range overlapped with a photographing range of the 3D image sensor, and an image processing element configured to acquire a position, posture and shape of the subject and the physical information by associating the 3D information of the subject acquired by the 3D image sensor and the physical information of the subject acquired by the 2D image sensor (First aspect of the present invention).

According to the environment recognition system of the first aspect of the present invention, the 3D information of the subject acquired through the 3D image sensor and the physical information acquired by the 2D image sensor are associated. Thereby, information needed by a device to perform operations on a subject (object) present in the marginal environment thereof, namely the position, the posture and the shape of the subject and the physical information thereof can be recognized with high accuracy. Moreover, since it is preferable to dispose the optical axes close to each other in order to make greater the overlapped portion between the photographing range of the 3D image sensor and the photographing range of the 2D image sensor, it is necessary to dispose the two sensors close to each other, thereby, it is expected to make the environment recognition system compact.

In the environment recognition system of the first aspect, it is acceptable that the image processing element is configured to calculate a plurality of converted positions as results of converting a plurality of first pixel positions from a first image coordinate system defined by a photographing area of the 3D image sensor to a second image coordinate system defined by a photographing area of the 2D image sensor, respectively, and calculate the 3D information of the subject associated to the physical information of the subject possessed by second pixels positioned close to at least three converted positions in the second image coordinate system on the basis of the 3D information of the subject which is possessed by the first pixels and is associated respectively to the at least three converted positions in the second image coordinate system (Second aspect of the present invention).

In the environment recognition system of the second aspect, it is acceptable that the image processing element is configured to calculate a plane passing through three positions in a global coordinate system as the 3D information of the subject which is possessed by the first pixels and is associated respectively to the three converted positions in the second image coordinate system, calculate a straight line passing through a principle point of the 2D image sensor and the second pixels positioned close to the three converted positions in the second image coordinate system, and calculate a position of an intersection point between the plane and the straight line in the global coordinate system as the 3D information of the subject associated to the physical information of the subject possessed by the second pixels (Third aspect of the present invention).

In the environment recognition system of the second aspect, it is acceptable that the image processing element is configured to calculate the physical information of the subject associated to the 3D information of the subject which is possessed by the first pixels and is associated respectively to the converted positions on the basis of the physical information of the subject possessed by one or a plurality of the second pixels present in a marginal environment of the converted position in the second image coordinate system (Fourth aspect of the present invention).

In the environment recognition system of the first aspect, it is acceptable that the image processing element is configured to calculate a plurality of converted positions as results of converting a plurality of first pixel positions from a first image coordinate system defined by a photographing area of the 3D image sensor to a second image coordinate system defined by a photographing area of the 2D image sensor, respectively, and calculate the physical information of the subject associated to the 3D information of the subject which is possessed by the first pixels and is associated to the converted positions on the basis of the physical information of the subject possessed by one or a plurality of the second pixels present in the marginal environment of the converted position in the second image coordinate system (Fifth aspect of the present invention).

According to the environment recognition system of any of the second to fifth aspects, the 3D information and the physical information are associated under consideration that the converted positions obtained as a result of converting the first pixels from the first image coordinate system to the second image coordinate system usually are not matched with the second pixel positions in the second image coordinate system. Thereby, the information needed by the device to perform operations on a subject can be recognized with high accuracy.

In the environment recognition system of the first aspect, it is acceptable that the 2D image sensor is configured to acquire color information or temperature information as the physical information of the subject, and the image processing element is configured to acquire the position, the posture and the shape of the subject, and either one or both of the color and the temperature information of the subject by associating the 3D information of the subject acquired through the 3D image sensor and either one or both of the color information and the temperature information of the subject acquired through the 2D image sensor (Sixth aspect of the present invention).

According to the environment recognition system of the sixth aspect, the information needed by the device to perform operations on a subject, namely in addition to the position, the posture and the shape of the subject, either one of or both of the color information and the temperature information of the subject can be recognized with high accuracy.

In the environment recognition system of the first aspect, it is acceptable that the 3D image sensor is configured to acquire luminance information of the subject to be added to the 3D information of the subject, and the image processing element is configured to perform calibration for obtaining parameters denoting a relationship among the 3D image coordinate system, the 2D image coordinate system and the global coordinate system by using luminance information and distance information of a calibration object acquired by the 3D image sensor and physical information of the calibration object acquired by the 2D image sensor, and to associate the 3D information of the subject acquired by the 3D image sensor and the physical information of the subject acquired by the 2D image sensor by using the obtained parameters (Seventh aspect of the present invention).

According to the environment recognition system of the seventh aspect, the calibration for obtaining parameters denoting a relationship between the first image coordinate system and the second image coordinate system is performed by using luminance information and the 3D information of a calibration object acquired by the 3D image sensor and physical information of the object acquired by the 2D image sensor. Then, the 3D information of the subject acquired by the 3D image sensor and the physical information of the subject acquired by the 2D image sensor are associated by using the parameters.

To attain an object described above, an environment recognition method according to the present invention which is configured to recognize an environment of a device comprises steps of: acquiring 3D information of a subject through photographing a marginal environment of the device with a 3D image sensor, acquiring physical information of the subject through photographing a range overlapped with a photographing range of the 3D image sensor with a 2D image sensor, and acquiring a position, posture and shape of the subject and the physical information of the subject by associating the 3D information of the subject and the physical information of the subject (Eighth aspect of the present invention).

According to the environment recognition method of the eighth aspect, the information needed by the device to perform operations on a subject present in the marginal environment thereof, namely the position, the posture and the shape of the subject and the physical information thereof can be recognized with high accuracy.

To attain an object described above, a robot according to the present invention which is provided with the environment recognition system according to any of claims 1 to 7 serves as the device configured to perform operations on the subject by using the position, posture and shape of the subject and the physical information recognized by the environment recognition system (Ninth aspect of the present invention).

According to the robot of the ninth aspect, since the position, the posture and the shape of the subject and the physical information of the subject present in the marginal environment thereof can be recognized with high accuracy, the robot can perform desired operations on the subject correctly. Since the system can be made compact, it is possible to make the entire robot compact or make the space thereof utilized efficiently.

DETAILED DESCRIPTION OF THE PREFERRED EMBODIMENTS

Hereinafter, an environment recognition system according to an embodiment of the present invention will be described in detail with reference to the drawings.

First, configurations of the environment recognition system and a robot (device) mounted with the environment recognition will be described. It should be noted that the environment recognition system may be mounted in various devices, such as a robot configured to perform manufacturing operations, transportation operations or the like on an object, and/or a vehicle configured to execute an operation control so as to avoid collision with an object (such as another vehicle in the front).

Figure 1:
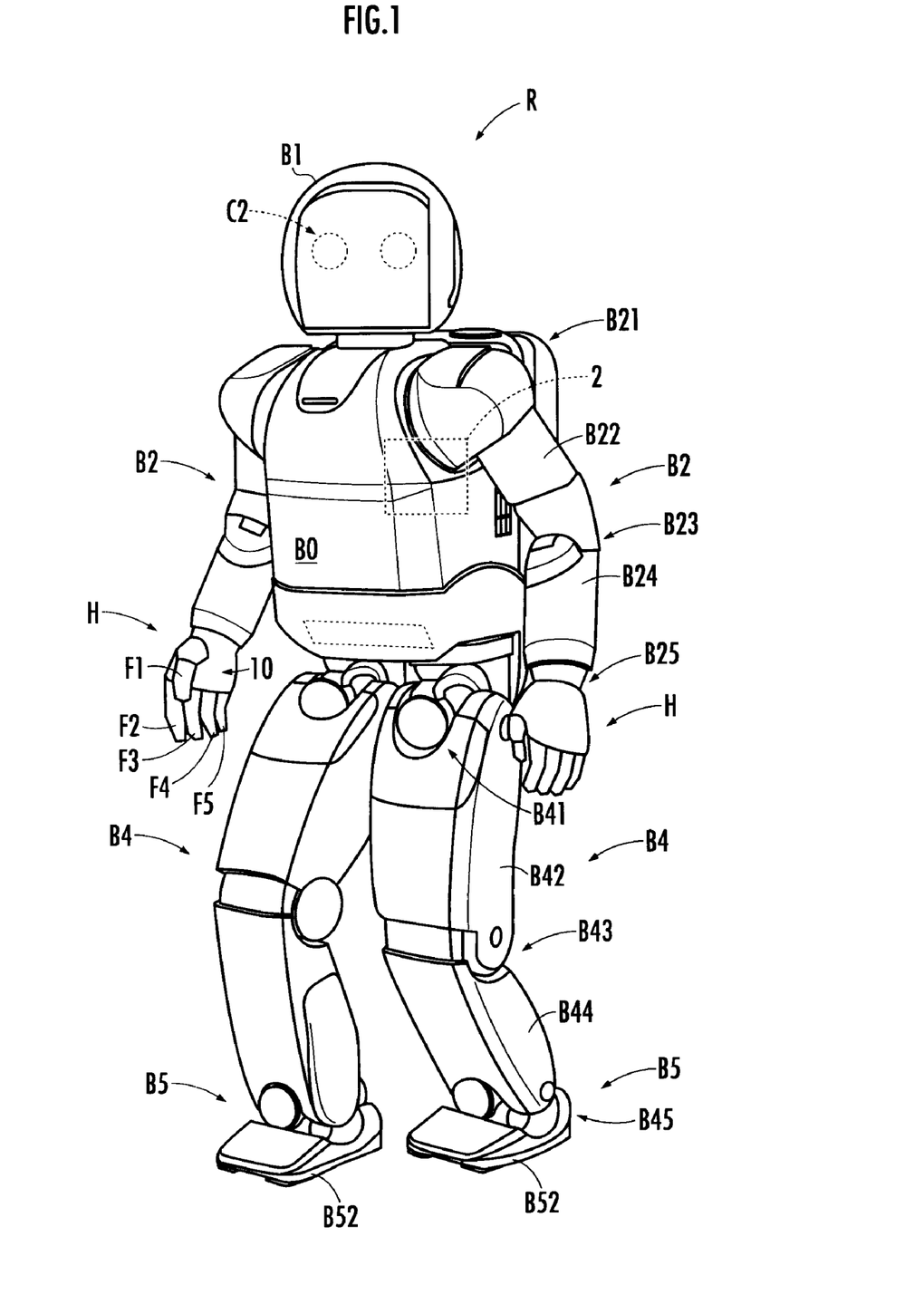
FIG. 1 is an explanatory diagram illustrating a structure of a robot mounted with an environment recognition system as an embodiment of the present invention.

The robot R illustrated in FIG. 1 is a humanoid robot moving on legs. Similar to a human being, the robot R has a body B0, a head B1 disposed at an upper portion of the body B0, a pair of left and right arms B2 extended from both lateral sides of the upper portion of the body B0, a hand H disposed at an end portion of each of the left and right arms B2, a pair of left and right legs B4 extended downward from a lower portion of the body B0. However, the robot R is not limited to a humanoid robot; it may be any type of robots provided with a mechanism equivalent to the arms B2 for changing positions and postures of the hands H.

The robot R is provided with a controller 2 (arithmetic processing element) configured to control motions thereof. It is acceptable that the controller 2 is a distributed control device composed of a main control unit and one or a plurality of sub control units connected through an internal network disposed in the robot R.

The controller 2 is composed of a computer (provided with a CPU, memories such as a ROM, a RAM and the like, and circuits such as an A/D circuit, an I/O circuit and the like). A control program is retrieved when appropriate from the memories by CPU in the controller, and the motions of the hands H are controlled according to the retrieved control program.

A plurality of actuators 4 are mounted in the robot R. The controller 2 controls operations of each of the actuators 4, and consequently, controls the motions of finger mechanisms F1 through F5 of the hand H and the motions or the like of each joint mechanism in the arm B2 and the leg B4.

The body B0 is composed of an upper portion and a lower portion joined in such a way that the two can rotate relatively around the yaw axis. The head B1 can move, for example, rotate around the yaw axis with respect to the main body B0.

The arm B2 is provided with a first arm link B22 and a second arm link B24. The body B0 and the first arm link B22 are joined through a shoulder joint mechanism (first arm joint mechanism) B21. The first arm link B22 and the second arm link B24 are joined through an elbow joint mechanism (second arm joint mechanism) B23. The second arm link B24 and the hand H are joined through a wrist joint mechanism (third arm joint mechanism) B25. The shoulder joint mechanism B21 has degrees of rotation freedom around the roll axis, the pitch axis and the yaw axis. The elbow joint mechanism B23 has a degree of rotation freedom around the pitch axis. The wrist around the pitch axis. The wrist joint mechanism B25 has degrees of rotation freedom around the roll axis, the pitch axis and the yaw axis.

The leg B4 is provided with a first leg link B42, a second leg link B44 and a foot B5. The main body B0 and the first leg link B42 are joined through a hip joint mechanism (first leg joint mechanism) B41. The first leg link B42 and the second leg link B44 are joined through a knee joint mechanism (second leg joint mechanism) B43. The second leg link B44 and the foot B5 are joined through an ankle joint mechanism (third leg joint mechanism) B45.

The hip joint mechanism B41 has degrees of rotation freedom around the roll axis, the pitch axis and the roll axis. The knee joint mechanism B43 has a degree of rotation freedom around the pitch axis. The ankle joint mechanism B45 has degrees of rotation freedom around the roll axis and the pitch axis. The hip joint mechanism B41, the knee joint mechanism B43 and the ankle joint mechanism B45 constitute a "leg joint mechanism group". The translation and the degree of rotation freedom for each joint mechanism included in the leg joint mechanism group may be changed where appropriate. It is acceptable to omit any one joint mechanism in the hip joint mechanism B41, the knee joint mechanism B43 and the ankle joint mechanism B45 and constitute the leg joint mechanism group with a combination of the remained two joint mechanisms. Moreover, when the leg B4 is provided with a second leg joint mechanism different from the knee joint, the leg joint mechanism group may be constituted by including the second leg joint mechanism. In order to relieve impact when stepping on floor, the bottom of the foot B5 is disposed with an elastic element B52 as disclosed in Japan Patent Laid-Open No. 2001-129774.

The head B1 is installed with a 3D image sensor C1 and a 2D image sensor C2.

In the present embodiment, the 3D image sensor C1 is a TOF (Time Of Flight) 3D sensor. The 3D image sensor C1 acquires 3D information of an object by photographing the front (a range in the right front of the head B1) of the robot R.

In the present embodiment, the 2D image sensor C2 is a color sensor. The 2D image sensor C2 acquires color information (physical information) of the object by photographing a range overlapped with the photographing range by the 3D image sensor C1.

A resolution of the 3D image sensor (for example, 176×244) is configured to be different from a resolution of the 2D image sensor (for example, 1024×768).

A first image coordinate system is defined according to the photographing area of the 3D image sensor C1, and a second image coordinate system is defined according to the photographing area of the 2D image sensor C2. The positions and the postures of the first image coordinate system and the second image coordinate system with respect to the robot coordinate system are stored in memory. As to be described hereinafter, the position and the posture of the object recognized in the global coordinate system are used to convert from the global coordinate system into the robot coordinate system. In the robot coordinate system, the mass center of the robot R (for example contained in the body B0), for example, is defined as the origin, the upward direction of the robot R is defined as +x direction, the rightward direction thereof is defined as +y direction, and the frontward direction thereof is defined as +z direction.

Figure 2:
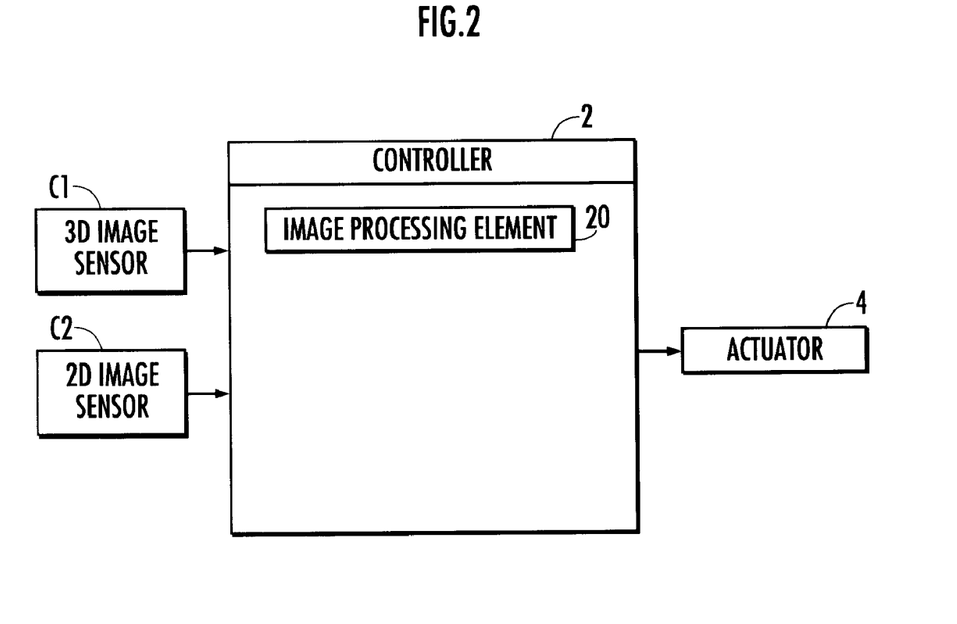
FIG. 2 is a block diagram illustrating the environment recognition system.

As to be described hereinafter, the controller 2 is provided with an image processing element 20 configured to process an image (refer to FIG. 2). The image processing element 20 may be composed of one or a plurality of modules separately.

Functions of the environment recognition system with the above-mentioned configuration will be described. Arithmetic processing results are stored in memory and retrieved out of memory where appropriate.

Figure 3:
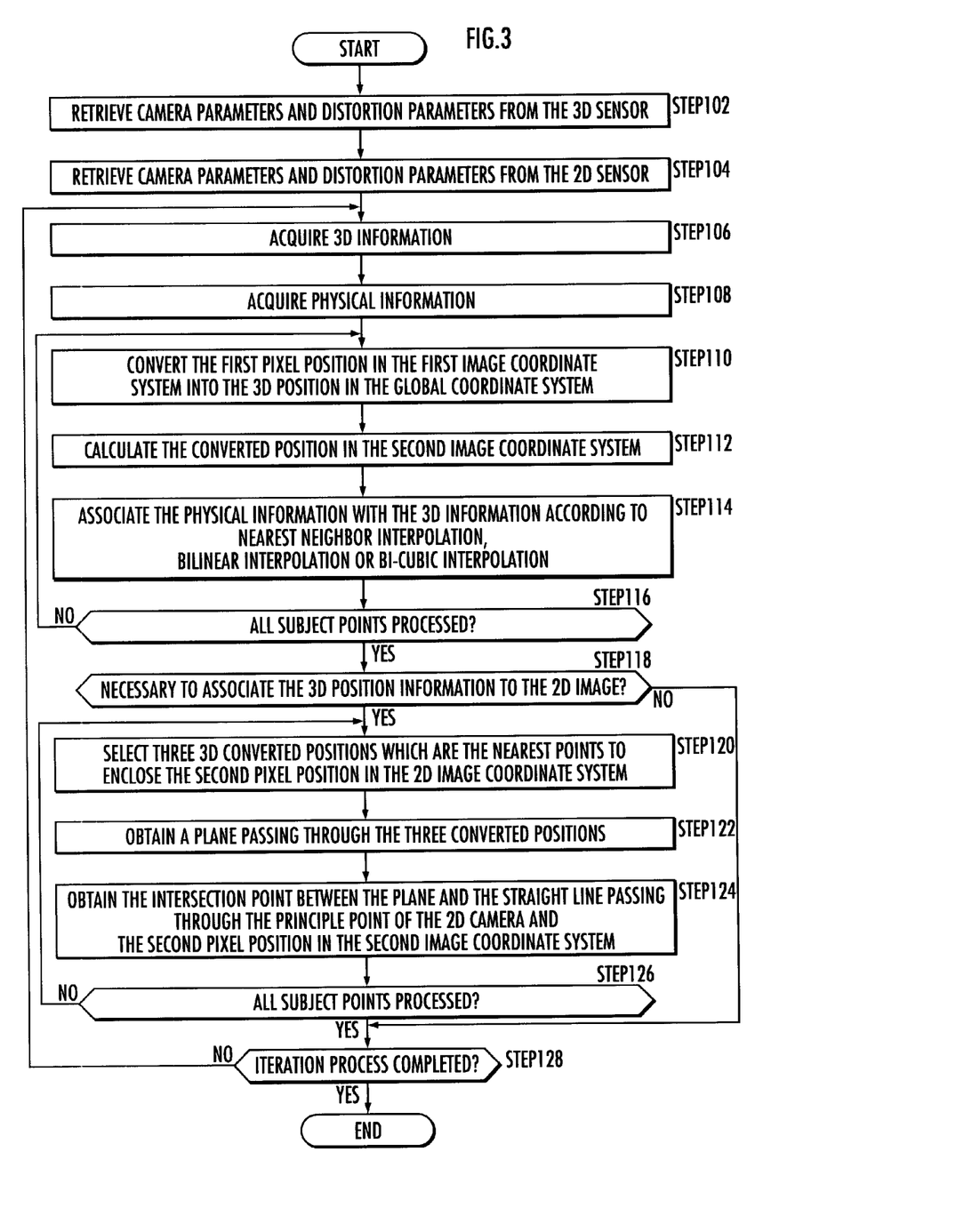
FIG. 3 is a flow chart illustrating a processing order of an environment recognition method as a first embodiment of the present invention.

Camera parameters and distortion parameters of the 3D image sensor C1 are retrieved from memory (FIG. 3/STEP 102). Camera parameters and distortion parameters of the 2D image sensor C2 are retrieved from memory (FIG. 3/STEP 104).

The 3D information of an object is acquired through photographing a marginal environment of the robot R with the 3D image sensor C1 (FIG. 3/STEP 106). The 3D information refers to a distance D to the object from the principle point of the sensor C1 at the position of each of a plurality of first pixels in the first image coordinate system.

The color information of an object is acquired through photographing the marginal environment of the robot R with the 2D image sensor C2 (FIG. 3/STEP 108). The color information refers to colors (specified by RGB values, for example) of the object at the position of each of a plurality of second pixels in the second image coordinate system.

Thereafter, the first pixel position in the first image coordinate system is converted to a point in the 3D global coordinate system (FIG. 3/STEP 110) by using the camera parameters and the distortion parameter of the 3D image sensors C1.

Figure 4:
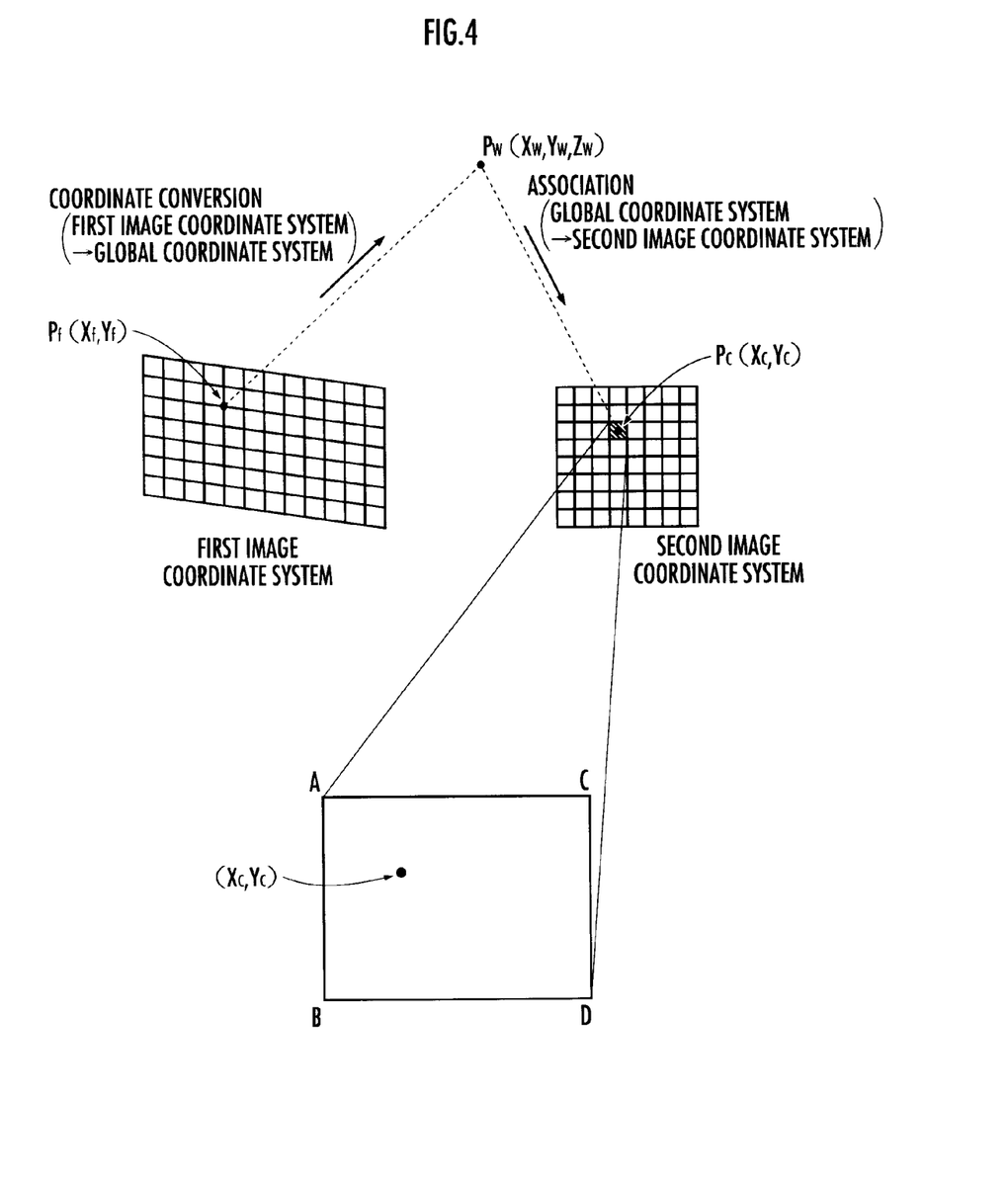
FIG. 4 is an explanatory diagram related to a method of matching a three dimensional coordinate system to a two dimensional coordinate system.

Specifically, the first pixel position P1 in the first image coordinate system is converted to the point Pw in the global coordinate system with the usage of a rotation matrix Rt and a translation vector Tt which serve as the camera parameters of the 3D image sensor C1 according to the relational expression (1). Thereby, as illustrated in FIG. 4, a quantized point (first pixel position) P1=(X1, Y1) in the 3D image coordinate system is converted to a point Pw=(xw, yw, zw) in the global coordinate system.

$$Pw = Rt^{-1}(P1 - Tt) \quad (1)$$

The first pixel position P1=(X1, Y1) can be calculated according to the distance D from the principle point of the 3D image sensor C1 to the point P1, the focal length f, the lens distortion parameters $\kappa_1$ and $\kappa_2$, the scale coefficient $s_x$ (usually set at "1") and the following relational expressions (2a) to (2c).

$$(d'_x x / s_x)(1 + \kappa_1 r^2 + \kappa_2 r^4) = f(X1/Z1) \quad (2a)$$

$$d_y y (1 + \kappa_1 r^2 + \kappa_2 r^4) = f(Y1/Z1) \quad (2b)$$

$$X1^2 + Y1^2 + Z1^2 = D^2 \quad (2c)$$

Herein, "r" is denoted according to the relational expression (3) by using an image origin (Cx, Cy) and the like.

$$r=((d'_x x/s_x)^2+(d'_y y)^2)^{1/2}, x=X1-Cx, y=Y1-Cy \quad (3)$$

"d" denotes the element distance $d_x$ in the x direction corrected according to the relational expression (4) by using the number of elements Ncx in the x direction and the number of samples Nfx in the scanning direction.

$$d'_x=(Ncx/Nfx)d_x \quad (4)$$

Subsequently, a converted position associated to the point Pw in the global coordinate system is calculated in the second image coordinate system (FIG. 3/STEP 112).

Specifically, a non-linear equation (7) is obtained by using a rotation matrix $R=(R_{ij})$ and a translation vector $T=(tx, ty, tz)$ which denote the camera parameters of the 2D image sensor C2 and the relational expressions (5) and (6).

$$x(1+\kappa_1 r^2+\kappa_2 r^4)=(s_x/d'_x)f(R_{11}xw+R_{12}yw+R_{13}zw+tx)/(R_{31}xw+R_{32}yw+R_{33}zw+tz) \quad (5)$$

$$y(1+\kappa_1 r^2+\kappa_2 r^4)=(1/d_y)f(R_{21}xw+R_{22}yw+R_{23}zw+ty)/(R_{31}xw+R_{32}yw+R_{33}zw+tz) \quad (6)$$

$$r+\kappa_1 r^3+\kappa_2 r^5=c=(c1^2+c2^2)^{1/2}.$$

$$c1=f(R_{11}xw+R_{12}yw+R_{13}zw+tx)/(R_{31}xw+R_{32}yw+R_{33}zw+tz),$$

$$c2=f(R_{21}xw+R_{22}yw+R_{23}zw+ty)/(R_{31}xw+R_{32}yw+R_{33}zw+tz) \quad (7)$$

The relational expression (8) is obtained by approximating the non-linear equation (7) according to Newton-Raphson method.

$$f(r_n)=r_n+\kappa_1 r_n^3+\kappa_2 r_n^5-c, f'(r_n)=1+3\kappa_1 r_n^2+5\kappa_2 r_n^4, r_n+1=r_n f(r_n)/f'(r_n) \quad (8)$$

$r_n$ is calculated iteratively according to the relational expression (8), and the convergence result when the convergence rate $|1-(r_{n+1}/r_n)|$ thereof is equal to or smaller than the threshold $\epsilon$ (for example, $\exp(-10)$) is calculated as an approximate solution of r.

The converted position $Pc=(xc, yc)$ in the second image coordinate system is calculated according to the relational expressions (3), (5) and (6) by using the approximate solution r. Thereby, as illustrated in FIG. 4, the converted position Pc in the second image coordinate system corresponded to the point $Pw=(xw, yw, zw)$ in the global coordinate system can be obtained.

As aforementioned, the resolution of the 3D image sensor C1 and the resolution of the 2D image sensor C2 are different from each other; however, it is necessary to perform interpolation despite whether or not there is a difference between the resolutions. The reason is that as illustrated in FIG. 4, normally, the converted position Pc in the second image coordinate system corresponded to the first pixel position (X1, Y1) in the first image coordinate system does not match the quantized point (the second pixel position) in the second image coordinate system. In FIG. 4, the converted position Pc in the second image coordinate system is contained in a rectangular area with the second pixel positions of A to D as the apexes.

In this situation, the color information (physical information) is associated to the 3D information according to, for example, the nearest neighbor interpolation, the bilinear interpolation or the bi-cubic interpolation method (FIG. 3/STEP 114).

According to the nearest neighbor interpolation method, the color information of the second pixel position A which is closest to the converted position Pc in the second image coordinate system is applied to the converted position Pc as the color information. According to the bilinear interpolation method, the color information of the converted position Pc is determined on the basis of a ratio of each distance from the converted position Pc to each of the second pixel positions of A to D enclosing the converted position Pc in the second image coordinate system and the color information of each of the second pixel positions of A to D. According to the bi-cubic interpolation method, the color information of the converted position Pc is determined on the basis of a total sum of 16 second pixel position including the 4 second pixel positions of A to D enclosing the converted position Pc in the second image coordinate system and further the 12 second pixel positions outer of the 4 second pixel positions of A to D, and the color information of each of the 16 second pixel positions.

Thereafter, whether or not the coordinate conversion to the global coordinate system, the determination of the corresponding converted position in the second image coordinate system, the calculation of the color information according to the nearest neighbor interpolation method or the like, and the association of the physical information (color information) to the 3D information mentioned above have been completed for a first pixel position (not necessary to be performed on all the first pixel positions) serving as a subject in the first image coordinate system is determined (FIG. 3/STEP 116).

If the determination result is negative (FIG. 3/STEP 116 . . . NO), the coordinate conversion to the global coordinate system, the determination of the corresponding converted position in the second image coordinate system, the calculation of the physical information (color information) according to the nearest neighbor interpolation method or the like, and the association of the physical information to the 3D information are iteratively performed on the remained first pixel positions serving as the subject (FIG. 3/STEP 110 to STEP 114).

On the other hand, if it is determined that the mentioned process has been performed on all the first pixel positions serving as the subject (FIG. 3/STEP 116 . . . YES), whether or not it is necessary to associate the 3D information to the 2D image is determined according to, for example, whether the resolution of the 3D image sensor C1 is greater than the resolution of the 2D image sensor C2 (FIG. 3/STEP 118). It is acceptable to omit the determination processing.

Figure 5:
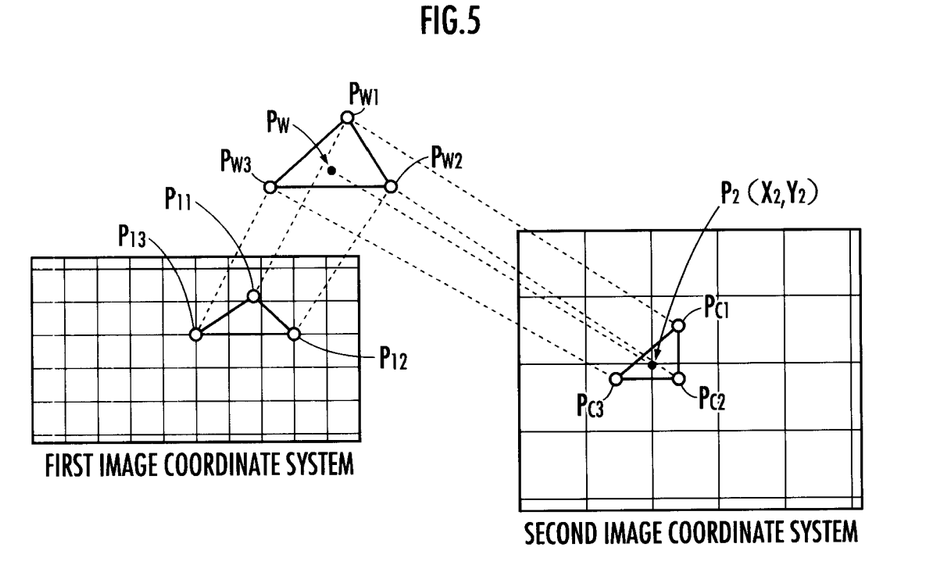
FIG. 5 an explanatory diagram related to a method of matching a three dimensional information to a physical information.

If the determination result is affirmative (FIG. 3/STEP 118 . . . YES), as illustrated in FIG. 5, the coordinate values of Pw1=(xw1, yw1, zw1), Pw2=(xw2, yw2, zw2) and Pw3=(xw3, yw3, zw3) in the global coordinate system corresponded respectively to the 3 converted positions Pc1, Pc2 and Pc3 which are the closet points to enclose the second pixel position P2=(X2, Y2) serving as the subject in the second image coordinate system are retrieved from memory (FIG. 3/STEP 120). Then, whether or not the 3 points of Pw1 Pw2 and Pw3 in the global coordinate system are in the same straight line is confirmed.

Thereafter, as illustrated in FIG. 5, a plane passing through the 3 points of Pw1, Pw2 and Pw3 in the global coordinate system is determined (STEP 3/STEP 122).

The plane passing through the 3 points of Pw1, Pw2 and Pw3 in the global coordinate system is donated by the relational expression (9).

$$u1xw+u2yw+u3zw=1,$$

$${}^t(u1,u2,u3)=Q^{-1 \cdot t}(1,1,1),$$

$$Q={}^t({}^tPw1, {}^tPw2, {}^tPw3) \quad (9)$$

Subsequently, a straight line passing through the principle point of the 2D image sensor C2 and the converted position Pc in the second image coordinate system is determined, and thereafter, an intersection point between the plane and the straight line is determined as the point Pw in the global coordinate system corresponded to the converted position Pc (FIG. 3/STEP 124).

The converted position pc=(Xc, Ye) in the second image coordinate system is denoted by the relational expressions (10) and (11).

$$Xc(1+\kappa_1 r^2+\kappa_2 r^4)=(s_x/d'_x)f(r_{11}Xw+r_{12}Xw+r_{13}Xw+tx)/(r_{31}Xw+r_{32}Yw+r_{33}Zw+tz)\ (r=(Xc)^2+(Yc)^2)^{1/2}) \quad (10)$$

$$Yc(1+\kappa_1 r^2+\kappa_2 r^4)=(1/d_y)f(r_{21}Xw+r_{22}Yw+r_{23}Zw+ty)/(r_{31}Xw+r_{32}Yw+r_{33}Zw+tz) \quad (11)$$

The coordinate value of Pw=(Xw, Yw, Zw) in the global coordinate system corresponded to the converted position is calculated according to the relational express (12) obtained from the relational expressions of (9) to (11).

$$^1(Xw,Yw,Zw)=B^{-1\cdot t}(1,1,1), B=(Bij),$$

$$B_{1j}=\{Xc(1+\kappa_1 r^2+\kappa_2 r^4)r_{3j}-(s_x/d'_x)f\times r_{ij}\}/\{(s_x/d'_x)f\times tx-Xc(1+\kappa_1 r^2+\kappa_2 r^4)\times tz\}.\ B_{3j}=uj \quad (12)$$

Thereafter, whether or not the selection of the 3 converted positions in 2D coordinate system to the global coordinate system, the determination of the plane in the global coordinate system, the determination of the straight line passing through the principle point of the 2D image sensor C2 and a second pixel position P2 (not necessary to be performed on all the second pixel positions) and the determination of the intersection point between the plane and the straight line have been completed for the second pixel position P2 serving as a subject in the second image coordinate system is determined (FIG. 3/STEP 126).

If the determination result is negative (FIG. 3/STEP 126 . . . NO), the selection of the 3 converted positions in 2D coordinate system to the global coordinate system, the determination of the plane in the global coordinate system, the determination of the straight line passing through the principle point of the 2D image sensor C2 and the second pixel position and the determination of the intersection point between the plane and the straight line are iteratively performed on the remained second pixel positions serving as the subject (FIG. 3/STEP 120 to STEP 124).

On the other hand, if it is determined that the mentioned process has been performed on all the second pixel positions serving as the subject (FIG. 3/STEP 126 . . . YES), whether or not it is necessary that the acquisition of the 3D information by the 3D image sensor C1 (refer to FIG. 3/STEP 106) and the acquisition of the physical information through the 21) image sensor C2 (refer to FIG. 3/STEP 108), and the subsequent iterative processing performed thereon is determined (FIG. 3/STEP 128). If it is determined that it is not necessary to associate the 3D information to the 2D image (FIG. 3/STEP 118 . . . NO), whether the iterative processing is necessary or not is determined (FIG. 3/STEP 128).

If it is determined that the iterative processing is necessary (FIG. 3/STEP 128 . . . NO), the acquisition of the 3D information by the 3D image sensor C1, the acquisition of the physical information through the 2D image sensor C2 and the subsequent processing performed thereon are carried out iteratively (refer to FIG. 3/STEP 106 to STEP 126).

If it is determined that the iterative processing is unnecessary (FIG. 3/STEP 128 . . . YES), the aforementioned series of processing are terminated.

According thereto, the position, posture and shape of an object in the global coordinate system and colors of each point in the global coordinate system, namely information related to the object which is necessary for the robot R to hold the object, are obtained. It is also acceptable to retrieve additional information of the object, such as the type, the mass center or the like of the object, which can be obtained through database searching, pattern matching or the like on the basis of the shape or the like of the object if necessary.

According to the environment recognition system exhibiting the above-mentioned functions, information related to an object present in a marginal environment of the robot R, namely a position, a posture and a shape of the object in the global coordinate system, and color of each point in the global coordinate system can be recognized with high accuracy. Thereby, the robot R can perform operations on the object serving as a subject with certain, such as holding the object or the like by moving the arm B2, the hand H and finger mechanisms of F1 to F5, respectively. Additionally, the robot R may adjust the position (position of the mass center of the main body B0) and the posture (angle of each axis of the main body coordinate system with respect to each axis of the global coordinate system) of the main body B0 by moving the leg B4 or the like before performing operations if necessary.

In order to enlarge the overlapped area between the photographing range of the 3D image sensor C1 and the photographing range of the 2D image sensor C2, it is desired to make the optical axes thereof closer, and consequently, the sensors C1 and C2 are disposed closer to make the system compact. If the system is made compact, it is possible to make the entire robot R compact or make the space thereof utilized efficiently.

As the 3D image sensor C1 for acquiring the 3D information, in addition to the TOF 3D image sensor, it is acceptable to use a part of or the entire part of a TOF 3D image sensor of a scanning type and a stereo camera. As the 2D image sensor C2 for acquiring the physical information, in addition to the visual light color camera to acquire the color of a subject, it is acceptable to use a part of or the entire part of a visual light monochrome camera to acquire shading information of the subject, an infrared camera to acquire night vision information of the subject, a far infrared camera to acquire temperature information of the subject, a millimeter wave camera to acquire millimeter wave source information, and a polarization camera to acquire information in the normal line of a plane.

Various combinations of the mentioned 3D image sensor C1 and the 2D image sensor C2 can be adopted. For example, as the constituent element of the environment system, the combination may be (1) one 3D image sensor C1 and one 2D image sensor C2, (2) one 3D image sensor C1 and a plurality of 2D image sensors C2 of the same type or different types, (3) a plurality of 3D image sensors C3 of the same type or different types and one 2D image sensors C2, or (4) a plurality of 3D image sensors C3 of the same type or different types and a plurality of 2D image sensors C2 of the same type or different types.

As another embodiment, descriptions will be carried out on image processing procedure when two 3D image sensors C1 (TOF 3D image sensor) and two 2D image sensors C2 of different types (one is visual light color camera and the other is far infrared camera) is adopted in the environment recognition system.

Figure 6:
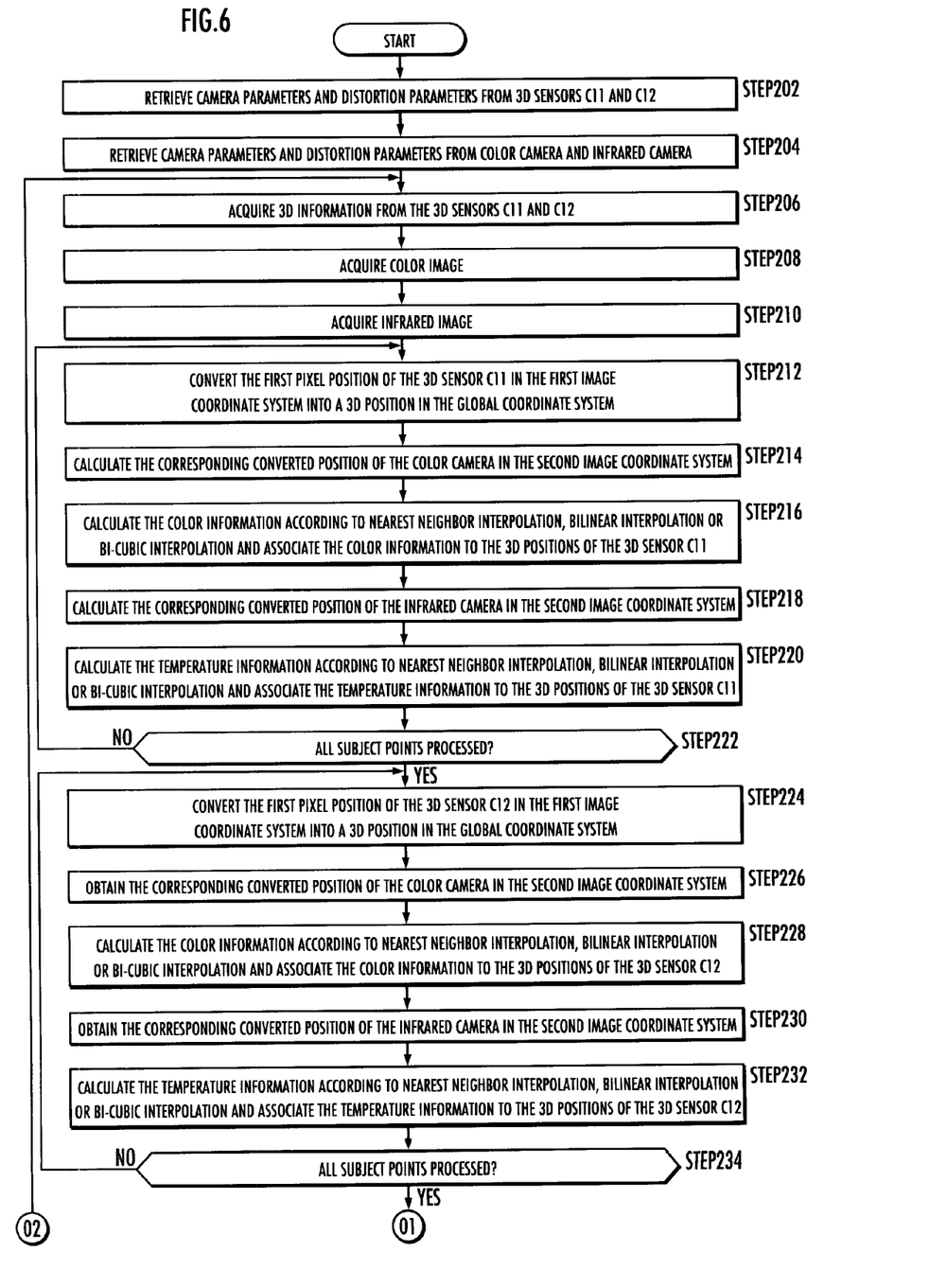
FIG. 6 is a flow chart illustrating a processing order of an environment recognition method as a second embodiment of the present invention (Example 1).

Firstly, the color parameters and the distortion parameters of each of the two 3D image sensors C1 are retrieved from memory (FIG. 6/STEP 202).

The color parameters and the distortion parameters of each of the two 2D image sensors C2 are retrieved from memory (FIG. 6/STEP 204).

The 3D information of a subject is obtained through photographing the marginal environment of the robot R with the two 3D image sensors C1, respectively (FIG. 6/STEP 206).

The physical information, namely the color information and the temperature information of the subject are obtained through photographing the marginal environment of the robot R with the color camera and the far infrared camera serving as the 2D image sensors C2, respectively (FIG. 6/STEP 208 and STEP 210).

Thereafter, the first pixel position in the first image coordinate system (2D coordinate system) of the first 3D image sensor C11 is converted to a point in the global coordinate system (3D coordinate system) by using the camera parameters and the distortion parameter of the first 3D image sensor C11 (FIG. 6/STEP 212).

Subsequently, a converted position Pc11 in the second image coordinate system of the color camera, which corresponds to the point Pw1=(xw1, yw1, zw1) in the global coordinate system, is calculated (FIG. 6/STEP 214).

Then, according to the nearest neighbor interpolation method or the like, the color information (R, G, B) of the converted position Pc11 is calculated, and the color information (R, G, B) is associated to the 3D information of the first pixel position P111 in the first image coordinate system of the first 3D image sensor C11 which corresponds to the converted position Pc 11 (FIG. 6/STEP 216 (refer to FIG. 4)).

Further, a converted position Pc 12 in the second image coordinate system of the far infrared camera, which corresponds to the point Pw1 in the global coordinate system, is calculated (FIG. 6/STEP 218).

Then, according to the nearest neighbor interpolation method or the like, the temperature information Temp (or luminance information Lum related to the temperature) of the converted position Pc12 is calculated, and the temperature information Temp is associated to the 3D information of the first pixel position P112 in the first image coordinate system of the first 3D image sensor C11 which corresponds to the converted position Pc12 (FIG. 6/STEP 220 (refer to FIG. 4)).

Thereafter, whether or not the coordinate conversion to the global coordinate system, the determination of the corresponding converted position in the second image coordinate system, the calculation of the physical information (the color information and the temperature information) according to the nearest neighbor interpolation method or the like, and the association of the physical information to the 3D information as mentioned above have been completed for a first pixel position (not necessary to be performed on all the first pixel positions) serving as a subject in the first image coordinate system of the first 3D image sensor C11 is determined (FIG. 6/STEP 222).

If the determination result is negative (FIG. 6/STEP 222 . . . NO), the coordinate conversion to the global coordinate system, the determination of the corresponding converted position in the second image coordinate system, the calculation of the physical information (the color information and the temperature information) according to the nearest neighbor interpolation method or the like, and the association of the physical information to the 3D information are iteratively performed on the remained first pixel positions serving as the subject (FIG. 6/STEP 212 to STEP 220).

On the other hand, if it is determined that the mentioned process has been performed on all the first pixel positions serving as the subject in the first image coordinate system of the first 3D image sensor C11 (FIG. 6/STEP 222 . . . YES), the first pixel position in the first image coordinate system (2D coordinate system) of the second 3D image sensor C 12 is coordinate converted to a point in the global coordinate system (3D coordinate system) by using the camera parameters and the distortion parameter of the second 3D image sensor C12 (FIG. 6/STEP 224).

Subsequently, a converted position Pc21 in the second image coordinate system of the color camera, which corresponds to the point Pw2=(xw2, yw2, zw2) in the global coordinate system, is calculated (FIG. 6/STEP 226).

Then, according to the nearest neighbor interpolation method or the like, the color information (R, G, B) of the converted position Pc21 is calculated, and the color information (R, G, B) is associated to the 3D information of the first pixel position P121 in the first image coordinate system of the second 3D image sensor C12 which corresponds to the converted position Pc21 (FIG. 6/STEP 228 (refer to FIG. 4)).

Further, a converted position Pc22 in the second image coordinate system of the far infrared camera, which corresponds to the point Pw2 in the global coordinate system, is calculated (FIG. 6/STEP 230).

Then according to the nearest neighbor interpolation method or the like, the temperature information Temp (or luminance information Lum related to the temperature) of the converted position Pc22 is calculated, and the temperature information Temp is associated to the 3D information of the first pixel position P122 in the first image coordinate system of the second 3D image sensor C12 which corresponds to the converted position Pc22 (FIG. 6/STEP 232 (refer to FIG. 4)).

Thereafter, whether or not the coordinate conversion to the global coordinate system, the determination of the corresponding converted position in the second image coordinate system, the calculation of the physical information (the color information and the temperature information) according to the nearest neighbor interpolation method or the like, and the association of the physical information to the 3D information as mentioned above have been completed for a first pixel position (not necessary to be performed on all the first pixel positions) serving as a subject in the first image coordinate system of the second 3D image sensor C12 is determined (FIG. 6/STEP 234).

If the determination result is negative (FIG. 6/STEP 234 . . . NO), the coordinate conversion to the global coordinate system, the determination of the corresponding converted position in the second image coordinate system, the calculation of the physical information (the color information and the temperature information) according to the nearest neighbor interpolation method or the like, and the association of the physical information to the 3D information are iteratively performed on the remained first pixel positions serving as the subject (FIG. 6/STEP 224 to STEP 232).

On the other hand, if it is determined that the mentioned process has been performed on all the first pixel positions serving as the subject in the first image coordinate system of the second 3D image sensor C12 (FIG. 6/STEP 234 . . . YES), whether or not it is necessary to associate the 3D information to the 2D image is determined (FIG. 7/STEP 236).

Figure 7:
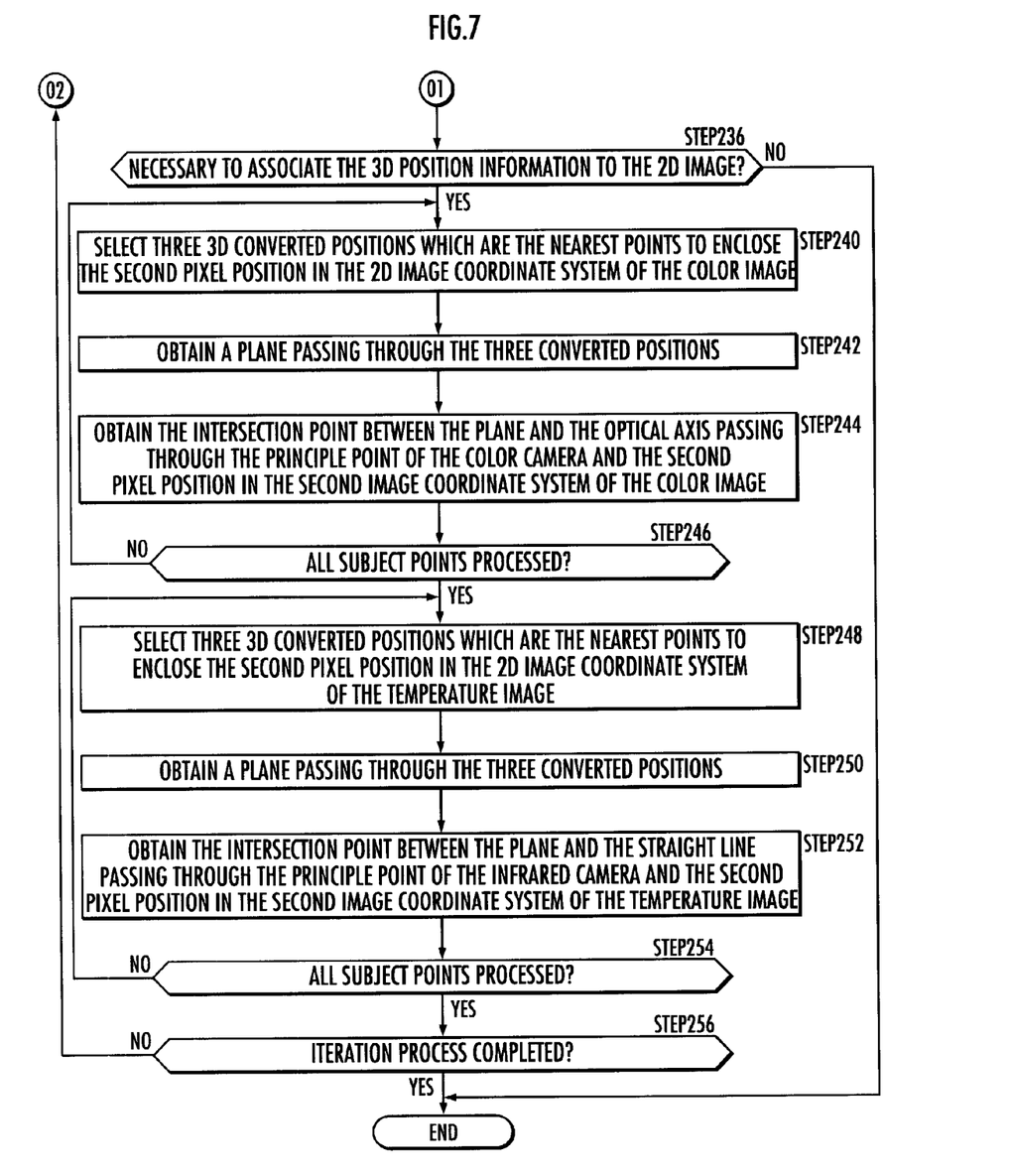
FIG. 7 is a flow chart illustrating a processing order of an environment recognition method as the second embodiment of the present invention (Example 2).

If the determination result is affirmative (FIG. 7/STEP 236 . . . YES), the coordinate values of three points in the global coordinate system corresponded respectively to the 3 converted positions which are the closet points to enclose the second pixel position P21 in the second image coordinate system of the color camera are retrieved from memory (FIG. 7/STEP 240). Thereafter, a plane passing through the 3 points in the global coordinate system is determined (STEP 7/STEP 242 (refer to FIG. 5 and the relational expression (9))).

Subsequently, an optical axis passing through the principle point of the color camera and the second pixel position P21 in the second image coordinate system of the color camera is determined, and thereafter, an intersection point between the plane and the optical axis is determined as the point Pw in the global coordinate system corresponded to the converted position Pc (FIG. 7/STEP 244 (refer to FIG. 5 and the relational expression (12))).

Thereafter, whether or not the selection of the 3 converted positions in 2D coordinate system to the global coordinate system, the determination of the plane in the global coordinate system, the determination of the optical axis passing through the principle point of the color camera and a second pixel position (not necessary to be performed on all the second pixel positions) and the determination of the intersection point between the plane and the optical axis have been completed for the second pixel position serving as a subject in the second image coordinate system of the color camera is determined (FIG. 7/STEP 246).

If the determination result is negative (FIG. 7/STEP 246 . . . NO), the selection of the 3 converted positions in 2D coordinate system to the global coordinate system, the determination of the plane in the global coordinate system, the determination of the optical axis passing through the principle point of the color camera and the second pixel position, and the determination of the intersection point between the plane and the optical axis are iteratively performed on the remained second pixel positions serving as the subject in the second image coordinate system of the color camera (FIG. 7/STEP 240 to STEP 244).

On the other hand, if it is determined that the mentioned process has been performed on all the second pixel positions serving as the subject in the second image coordinate system of the color camera (FIG. 7/STEP 246 . . . YES), the coordinate values of points in the global coordinate system corresponded respectively to the converted positions which are the closet points to enclose the second pixel position P22 serving as the subject in the second image coordinate system of the far infrared camera are retrieved from memory (FIG. 7/STEP 248). Thereafter, a plane passing through the 3 points in the global coordinate system is determined (STEP 7/STEP 250 (refer to FIG. 5 and the relational expression (9))).

Subsequently, a straight line passing through the principle point of the far infrared camera and the second pixel position P22 in the second image coordinate system of the far infrared camera is determined, and thereafter, an intersection point between the plane and the straight line is determined as the point Pw in the global coordinate system corresponded to the converted position Pc (FIG. 7/STEP 252 (refer to FIG. 5 and the relational expression (12))).

Thereafter, whether or not the selection of the 3 converted positions in 2D coordinate system to the global coordinate system, the determination of the plane in the global coordinate system, the determination of the straight line passing through the principle point of the far infrared camera and a second pixel position (not necessary to be performed on all the second pixel positions) and the determination of the intersection point between the plane and the straight line have been completed for the second pixel position serving as a subject in the second image coordinate system of the far infrared camera is determined (FIG. 7/STEP 254).

If the determination result is negative (FIG. 7/STEP 254 . . . NO), the selection of the 3 converted positions in 2D coordinate system to the global coordinate system, the determination of the plane in the global coordinate system, the determination of the straight line passing through the principle point of the far infrared camera and the second pixel positions and the determination of the intersection point between the plane and the straight line are iteratively performed (FIG. 7/STEP 248 to STEP 252).

On the other hand, if it is determined that the mentioned process has been performed on all the second pixel positions serving as the subject in the second image coordinate system of the far infrared camera (FIG. 7/STEP 254 . . . YES), whether or not it is necessary that the acquisition of the 3D information by each of the two 3D image sensors C1 (refer to FIG. 6/STEP 206) and the acquisition of the physical information through each of the two 2D image sensors C2 (refer to FIG. 6/STEP 208 and STEP 210), and the subsequent iterative processing performed thereon is determined (FIG. 7/STEP 256). If it is determined that it is not necessary to associate the 3D information to the 2D image (FIG. 7/STEP 236 . . . NO), whether the iterative processing is necessary or not is determined (FIG. 7/STEP 256).

If it is determined that the iterative processing is necessary (FIG. 7/STEP 256 . . . NO), the acquisition of the 3D information by each of the two 3D image sensors C1, the acquisition of the physical information by each of the two 2D image sensors C2 and the subsequent processing performed thereon are carried out iteratively (refer to FIG. 6/STEP 206 to STEP 234, FIG. 7/STEP 236 to STEP 254).

If it is determined that the iterative processing is unnecessary (FIG. 7/STEP 256 . . . YES), the aforementioned series of image processing are terminated.

According thereto, the information related to the object which is necessary for the robot R to hold the object, namely, the position, posture and shape of an object in the global coordinate system and the physical information of each point of the object (color and temperature) in the global coordinate system, are obtained.

Note that it is acceptable to perform calibration according to an approach to be described hereinafter to acquire the camera parameters.

Firstly, a 3D image composed of pixels having luminance information and distance information is obtained by photographing a calibration board (an object used for calibration) in the marginal environment of the robot R through the usage of the 3D image sensor C1.

By photographing the calibration board through the usage of the 2D image sensor C2 in a range overlapped with the photographing range of the 3D image sensor C1, a 2D image composed of pixels having color information is obtained.

Camera parameters are determined according to the calibration. The calibration is performed according to common approaches (refer to R. Y. Tsai: "An Efficient and accurate calibration technique for 3D machine vision" (CVPR, pp. 364-374 (1986)), and R. Y. Tsai: "A versatile camera calibration technique for high-accuracy 3D machine vision metrology using off-the-shelf TV cameras and lenses" (J-RA, vol. 3, pp. 323-344 (1987))).

Figure 8:
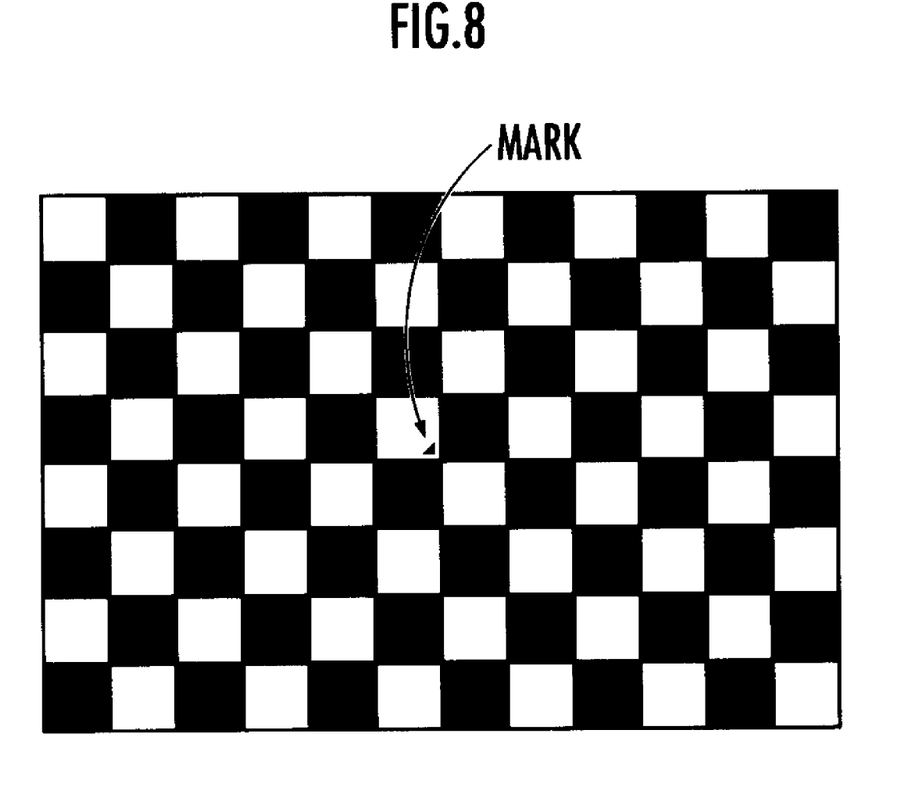
FIG. 8 is an exemplary diagram of a calibration board.

Herein, as illustrated in FIG. 8, the calibration board used has squares in black and white colors arranged alternatively to a checkered pattern, and there is a triangular mark in the corner of a white square position close to the center of the board. The mark is used to confirm whether or not the apexes of the plurality of squares of the board taken by one camera correspond to the apexes of the plurality of squares of the board taken by the other camera.

The formation of the pattern may be varied according to the type of the image sensor serving as the calibration subject. For example, if the 2D image sensor C2 is an active near infrared camera, the aforementioned pattern may be formed according to the presence of coatings which reflect near infrared rays.

The mark is formed by coating infrared-reflecting coatings or fixing an infrared-reflecting seal on the board. Thereby, it can be expected to improve the recognition accuracy of the mark via the 3D image sensor. The surface of the board is processed with white squares to prevent diffused reflection and with black squares to induce diffused reflection. Thereby, it can be expected to improve the recognition accuracy of the black-white pattern via the 3D image sensor.

External parameters and internal parameters of the camera are calculated according to global coordinates obtained through calibration and corresponded image coordinates of the camera and the relational expressions (3), (5) and (6). The rotation matrix R (tertiary square matrix having three unknown quantities) and the translation vector T (having three unknown quantities) are calculated as the external parameters. The focal length f, the lens distortion parameters $\kappa_1$ and $\kappa_2$, the scale coefficient $s_x$ (which is normally set equal at "1") and the origin of the image (Cx, Cy) are determined as the internal parameters. The camera parameters obtained through calibration are store in memory.

What is claimed is:

1. An environment recognition system configured to recognize an environment of a device, comprising:
    a 3D image sensor configured to photograph a marginal environment of the device and to acquire 3D information of a subject by photographing the marginal environment of the device,
    a 2D image sensor configured to photograph a range overlapped with a photographing range of the 3D image sensor and to acquire physical information of the subject by photographing the range overlapped with the photographing range of the 3D image sensor, and
    an image processing element configured to acquire a position, posture and shape of the subject and the physical information by associating the 3D information of the subject acquired by the 3D image sensor and the physical information of the subject acquired by the 2D image sensor,
    wherein the 3D image sensor is independent from the 2D image sensor, and a resolution of the 3D image sensor is different from a resolution of the 2D image sensor.

2. The environment recognition system according to claim 1, wherein the image processing element is configured to
    calculate a plurality of converted positions as results of coordinate converting a plurality of first pixel positions from a first image coordinate system defined by a photographing area of the 3D image sensor to a second image coordinate system defined by a photographing area of the 2D image sensor, respectively, and
    calculate the 3D information of the subject associated to the physical information of the subject possessed by second pixels positioned close to at least three converted positions in the second image coordinate system on the basis of the 3D information of the subject which is possessed by the first pixels and is associated respectively to the at least three converted positions in the second image coordinate system.

3. The environment recognition system according to claim 2, wherein the image processing element is configured to
    calculate a plane passing through three positions in a global coordinate system as the 3D information of the subject which is possessed by the first pixels and is associated respectively to the three converted positions in the second image coordinate system,
    calculate a straight line passing through a principle point of the 2D image sensor and the second pixels positioned close to the three converted positions in the second image coordinate system, and
    calculate a position of an intersection point between the plane and the straight line in the global coordinate system as the 3D information of the subject associated to the physical information of the subject possessed by the second pixels.

4. The environment recognition system according to claim 2, wherein the image processing element is configured to
    calculate the physical information of the subject associated to the 3D information of the subject which is possessed by the first pixels and is associated respectively to the converted positions on the basis of the physical information of the subject possessed by one or a plurality of the second pixels present in a marginal environment of the converted position in the second image coordinate system.

5. The environment recognition system according to claim 1, wherein the image processing element is configured to
    calculate a plurality of converted positions as results of converting a plurality of first pixel positions from a first image coordinate system defined by a photographing area of the 3D image sensor to a second image coordinate system defined by a photographing area of the 2D image sensor, respectively, and
    calculate the physical information of the subject associated to the 3D information of the subject which is possessed by the first pixels and is associated to the converted positions on the basis of the physical information of the subject possessed by one or a plurality of the second pixels present in the marginal environment of the converted position in the second image coordinate system.

6. The environment recognition system according to claim 1, wherein
    the 2D image sensor is configured to acquire color information or temperature information as the physical information of the subject, and
    the image processing element is configured to acquire the position, the posture and the shape of the subject, and either one or both of the color and the temperature information of the subject by associating the 3D information of the subject acquired through the 3D image sensor and either one or both of the color information and the temperature information of the subject acquired through the 2D image sensor.

7. The environment recognition system according to claim 1, wherein
    the 3D image sensor is configured to acquire luminance information of the subject to be added to the 3D information of the subject, and
    the image processing element is configured to perform calibration for obtaining parameters denoting a relationship among the 3D image coordinate system, the 2D image coordinate system and the global coordinate system by using luminance information and distance information of a calibration object acquired by the 3D image sensor and physical information of the calibration object acquired by the 2D image sensor, and to associate the 3D information of the subject acquired by the 3D image sensor and the physical information of the subject acquired by the 2D image sensor by using the obtained parameters.

8. An environment recognition method which is configured to recognize an environment of a device, comprising steps of:
    photographing a marginal environment of the device with a 3D image sensor and acquiring 3D information of a subject through the photographing of the marginal environment of the device with a 3D image sensor having a first resolution,
    photographing a range overlapped with a photographing range of the 3D image sensor with a 2D image sensor, which is independent from the 3D image sensor, and acquiring physical information of the subject through the photographing of the range overlapped with the photographing range of the 3D image sensor with the 2D image sensor having a second resolution different from the first resolution, and acquiring a position, posture and shape of the subject and the physical information of the subject by associating the 3D information of the subject and the physical information of the subject.

9. A robot provided with an environment recognition system, wherein the environment recognition system is provided with a 3D image sensor configured to photograph a marginal environment of the robot and to acquire 3D information of a subject by photographing the marginal environment of the robot, a 2D image sensor configured to photograph a range overlapped with a photographing range of the 3D image sensor and to acquire physical information of the subject by photographing the range overlapped with the photographing range of the 3D image sensor, and an image processing element configured to acquire a position, posture and shape of the subject and the physical information of the subject by associating the 3D information of the subject acquired by the 3D image sensor and the physical information of the subject acquired by the 2D image sensor, wherein the 3D image sensor is independent from the 2D image sensor, and a resolution of the 3D image sensor is different from a resolution of the 2D image sensor, and the robot is configured to perform operations on the subject by using the position, posture and shape of the subject and the physical information recognized by the environment recognition system.

10. The environment recognition system according to claim 1, wherein the 3D image sensor is a time of flight 3D sensor.

11. The environment recognition system according to claim 10, wherein the 2D image sensor is at least one of a light color camera and a far infrared camera.

12. The environment recognition system according to claim 1, wherein said range overlapped with the photographing range of the 3D image sensor is partially different from the photographing range of the 3D image sensor.

13. The environment recognition system according to claim 6, wherein the 2D image sensor is a far infrared camera, and the 2D image sensor is configured to acquire only temperature information as the physical information of the subject, and the image processing element is configured to acquire the position, the posture and the shape of the subject, and the temperature information of the subject by associating the 3D information of the subject acquired through the 3D image sensor and the temperature information of the subject acquired through the 2D image sensor.

14. The robot according to claim 9, wherein the 3D image sensor is a time of flight 3D sensor.

15. The robot according to claim 14, wherein the 2D image sensor is at least one of a light color camera and a far infrared camera.

16. The robot according to claim 9, wherein said range overlapped with the photographing range of the 3D image sensor is partially different from the photographing range of the 3D image sensor.

17. The robot according to claim 9, wherein the 2D image sensor is a far infrared camera configured to acquire temperature information as the physical information of the subject, and the image processing element is configured to acquire the position, the posture and the shape of the subject, and the temperature information of the subject by associating the 3D information of the subject acquired through the 3D image sensor and the temperature information of the subject acquired through the 2D image sensor.

18. The method according to claim 8, wherein said range overlapped with the photographing range of the 3D image sensor is partially different from the photographing range of the 3D image sensor.

* * * * *